Sept. 11, 1962  H. B. BABSON  3,053,272
VACUUM REGULATOR
Filed Nov. 16, 1960
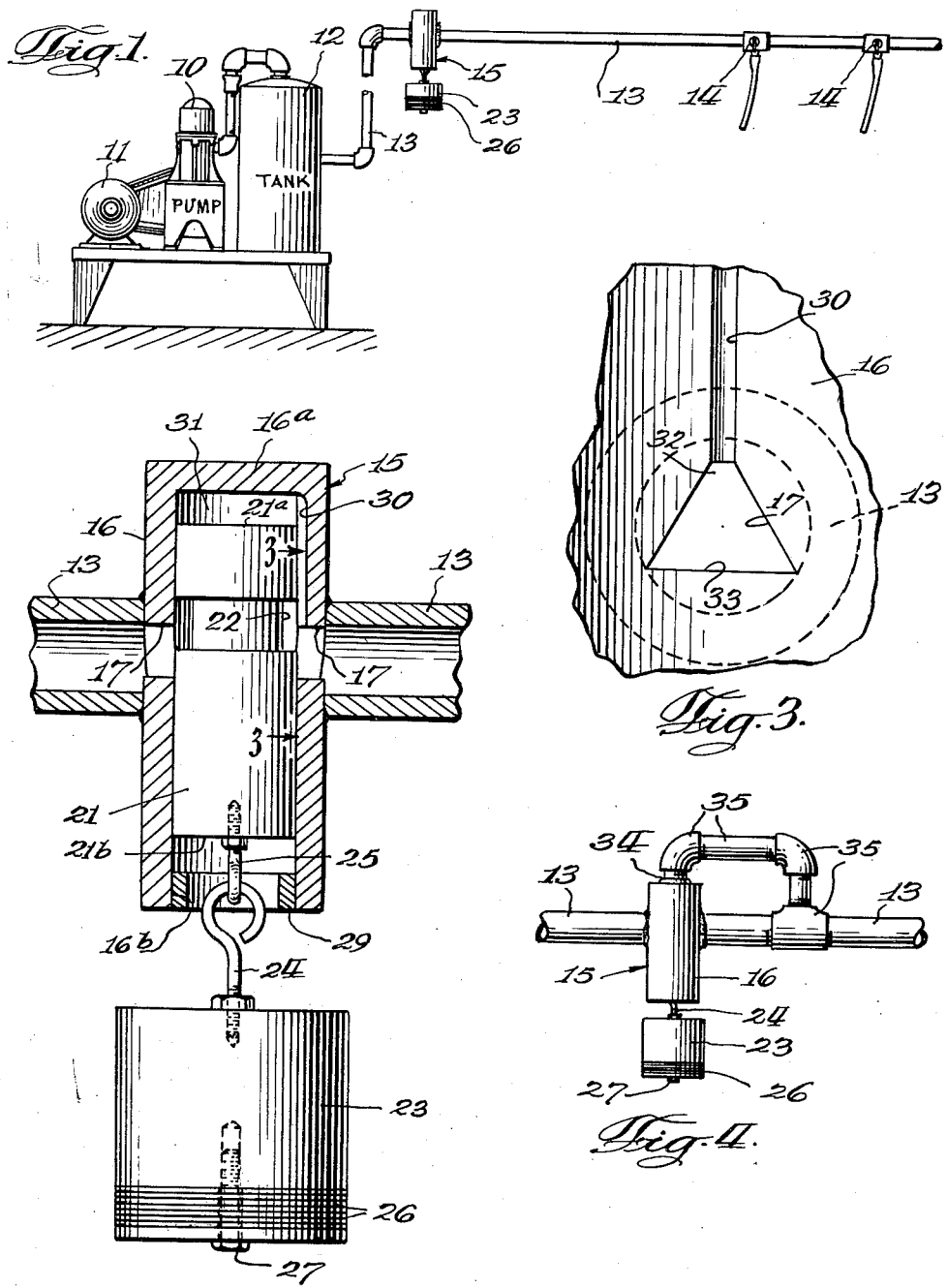
INVENTOR.
Henry B. Babson
BY
Hofgren, Brady, Wegner, Allen & Stellman
Attorneys 3,053,272
VACUUM REGULATOR
Henry B. Babson, Chicago, Ill., assignor to Babson
Bros. Co., a corporation of Illinois
Filed Nov. 16, 1960, Ser. No. 69,614
5 Claims. (Cl. 137—505.13)

This invention relates to a vacuum regulator and more particularly to a vacuum regulator incorporated in an automatic milking system that will maintain the vacuum in the system at a relatively uniform level although the load on the system may change.

In an automatic milking system a number of milking units are connected to a vacuum line or an evacuated milk line in which the vacuum level must be kept relatively constant for optimum milking operations. The preferred level of vacuum in a milker unit is equivalent to that required to support a 14 to 15 inch column of mercury, and is usually referred to as "14 to 15 inches of vacuum." A vacuum pump is connected at one end of the vacuum line, and generally has a higher capacity than that required to maintain the desired vacuum level in the system, and a vacuum regulator is provided in the line. As the vacuum level increases or decreases in the system due to milker units being connected or disconnected from the line or for other reasons, the vacuum regulator operates to compensate for the change and maintain the preferred vacuum level.

Vacuum regulators now used in many automatic milking systems have a valve which opens and allows air at atmospheric pressure to enter the vacuum line and reduce the vacuum to the desired level. The amount of air admitted depends on the difference or differential between the vacuum established by the pump and that desired. With this type of vacuum regulation a vacuum pump is required having a much higher capacity than the predetermined vacuum level since outside or atmospheric air is continually entering the system.

A primary object of this invention is to provide a new and improved vacuum regulator for maintaining a relatively uniform vacuum level in an automatic milking system that is subject to changing load conditions without introducing outside air, and which avoids dirt particles carried by such air.

Another object of this invention is to provide a vacuum regulator connected between an unregulated vacuum source and a vacuum pipeline subject to variable load conditions and having a valve member difining a flow passage, in which the area of said flow passage changes as the load in the vacuum line varies to maintain a predetermined vacuum level in the line, and which enables a vacuum reserve to build up in the tank normally associated with a vacuum pump.

Further features and advantages of the invention will readily be apparent from the following specification and from the drawings, in which:

FIG. 1 is an elevational view of a vacuum system utilizing an embodiment of the vacuum regulator;

FIG. 2 is an enlarged vertical sectional view taken along the center line of the pipeline and vacuum regulator of FIG. 1 showing the valve of the regulator in an open position;

FIG. 3 is a fragmentary sectional view of the vacuum regulator taken substantially along line 3—3 of FIG. 2; and FIG. 4 is an elevational view of a modified vacuum regulator.

Referring to the drawings and particularly to FIG. 1, a vacuum arrangement, as used in an automatic milking system, includes a vacuum pump 10 driven by a motor 11 and connected through a reservoir tank 12 to a pipeline 13 on which connections 14 are provided for the attachment of milking units (not shown). Optimum operation of such a milking system generally requires 14 to 15 inches of vacuum in the line 13, and the pump 10 should have a capacity adequate to maintain a somewhat greater degree of vacuum. A vacuum regulator 15 is connected in the pipeline 13, preferably at a point close to the tank 12, and controls the vacuum level in the line to which the milking units are connected, keeping it relatively constant even though the load varies due to the operating changes in the system.

The embodiment of the vacuum regulator 15 illustrated in FIG. 2 comprises a first valve member 16 consisting of an elongated tubular body with a closed top end 16a and an open bottom end 16b and having openings 17 provided in the side walls generally midway the two ends. The openings are on opposite sides of the member 16 and are preferably aligned with each other.

The movable portion of the vacuum regulator comprises a second valve member, including an elongated cylindrical element 21, having a top end 21a and a bottom end 21b, slidably received by the first valve member and provided with an annular recess 22 around the outer surface thereof generally midway the two ends. The cross section of the annular recess 22 is preferably rectangular and is in general alignment with the openings 17 to provide a flow passage through the vacuum regulator 15. A weight 23 is connected to a pair of flexibly joined connecting links 24 and 25 to the lower end 21b of the slidable element 21 at its center. When the vacuum pump 10 is in operation a vacuum is created in the pipeline 13. The vacuum regulator is constructed so that the vacuum level in the line 13 appears on the top surface 21a of the second valve member 21 and atmospheric pressure appears on the bottom surface 21b. If the vacuum in the line is greater than the desired level, the pressure differential between the top and bottom surfaces of the second valve member 21 acts to close off the flow passage and reduce the vacuum to the desired level, and if the vacuum in the line is less than the desired level the weight 23 will urge the second valve member to open the flow passage and increase the vacuum level.

The weight 23 is preferably sufficient to establish 14 to 15 inches of vacuum in the system and individual discs 26 may be added or removed to the bottom of the weight 23 by a screw 27 to change the preferred vacuum level. The flexible support, of the weight 23, provided by the links 24 and 25 insures a more accurate and uniform control of the vacuum level in the system since the second valve member 21 has less tendency to bind along the inner walls of the valve member 16 as it moves up and down to control the vacuum level than it would with a rigid connection.

A stop member 29 comprising an annular ring is affixed to the inner surface of the first valve member 16 adjacent the open end 16b and provides a stop to limit the downward movement of the second valve 21 and contain it within the first valve member. A groove 30 is provided in the inner side wall surface of the valve member 16 beginning at the top of one of the openings 17 and extends upwardly, terminating at the top 16a, providing a passage connecting the one opening 17 to the space 31 above the top surface 21a of the second valve member 21.

As shown in the drawings the vacuum regulator 15 is connected in the vacuum line 13, preferably close to the tank 12. The portion of the pipeline 13 containing the milking units is directly connected to the one opening 17 that is associated with the groove 30 and the portion of the line 13 leading from the reservoir tank 12 is connected to the other opening 17 of the vacuum regulator.

The operation of the vacuum regulator embodied in the milking system will now be described. When the vacuum pump 10 is inoperative the movable valve member 21 is at its lowermost position supported by the stop member 29, and the annular recess 22 is in line with the openings 17 providing a flow passage from the vacuum pump side of the system through one of the openings 17, around the annular recess 22 of the second valve member 21, through the other opening 17 and into the pipeline containing the milking units. When the vacuum pump is in operation a vacuum is created in the pipeline 13 and about the annular recess 22; the vacuum will also be present in the space 31 at the top portion of the first valve member 16 through the communication of groove 30. It has been mentioned that the pump 10 is of a greater capacity than the vacuum level desired in the system; therefore, the initial vacuum present in the line 13 and in the space 31 is higher than the desired level. Since the vacuum is present on the top surface 21a of the valve member 21 and atmospheric pressure is present on the bottom surface 21b the differential pressure urges the valve member 21 upwardly against the downward urging of the weight 23 to move the annular recess 22 away from its "in line" relationship with the openings 17, as shown in FIG. 2, to close off the area of flow passage through the vacuum regulator and thereby cut down the vacuum level in the line containing the milking units. The weight 23 allows the valve member 21 to move upwardly only an amount sufficient to attain the desired vacuum level. When conditions in the milking system change such as by connecting or disconnecting a milking unit in the system, the vacuum level also changes and the valve member 21 moves upwardly or downwardly, decreasing or increasing the area of the flow passage to maintain the vacuum in the pipeline at the desired level.

As shown in FIG. 3, the openings 17 in the first valve member 16 are preferably triangular in shape with an apex 32 of the triangle toward the upper end 16a and a base 33 of the triangle toward the lower end 16b of the first valve member. During normal milking operation the member 21 is positioned near the top end of the first valve member 16, as in FIG. 2, so that the flow passage area is defined by the upper apex portion 32 of the triangular openings. When a great change in operating conditions occurs in the milking system to decrease the vacuum level, the movable member 21 drops near the open end 16b thereby greatly increasing the area of the flow passage and rapidly returning the vacuum in the line to the predetermined level.

FIG. 4 shows a modified embodiment of the invention as installed in the vacuum pipeline 13 in a manner similar to the installation shown in FIG. 1. The top portion 16a of the first valve member 16 is provided with a centrally located hole 34 therethrough for receiving pipe fittings 35 to connect the hole with the vacuum line 13 at a point towards the milking connections 14. The connection defined by the pipe fittings 35 serves the same purpose as the groove 30 of the first described embodiment of the vacuum regulator and the operation is essentially the same.

While I have shown and described certain embodiments of my invention, it is to be understood that it is capable of many modifications. Changes therefore, in the construction and arrangement may be made without departing from the spirit and scope of the invention as disclosed in the appended claims.

I claim:

1. In a vacuum milking system having an unregulated vacuum source and a vacuum line, a vacuum regulator connected between said unregulated source of said vacuum line, comprising: a first valve member including a tubular body having one closed end and one open end, openings in the side walls thereof generally midway the ends and being in line and opposite one another for connection with said source and said vacuum line, and an internal groove extending from the one of said openings connected to the vacuum line to the closed end thereof; a second valve member including an elongated cylindrical element slidable in said body, there being a flow passage defined by said members; a weight affixed to said element urging the element toward the open end of the first valve member to open the flow passage, an annular stop member affixed to the first valve member, adjacent said open end, limiting the downward movement of the second valve member; whereby said internal groove operably connects said vacuum line with the closed end of said first valve member, the vacuum therein urging said second valve member toward said closed end to close said flow passage in accordance with the level thereof.

2. In a vacuum milking system having an unregulated vacuum source and a vacuum line, a vacuum regulator connected between said vacuum source and the vacuum line, comprising: a first valve member including an elongated tubular body having a closed top end and an open bottom end, triangular shaped openings in the side walls thereof generally midway the ends and being in line and opposite one another for connection with said vacuum source and vacuum line, and an internal groove extending from the apex of the one of the triangular openings connected to the vacuum line, to the closed end of the body; a second valve member including an elongated cylindrical element slidable in the first valve member and having an annular recess about the surface thereof generally midway its ends, there being a flow passage through the vacuum regulator including said openings and annular recess; a weight affixed to said elongated element extending downwardly through the open end of the first valve member and urging said element towards the open end to open the flow passage; stop means affixed to the first valve member, limiting the downward movement of the second valve member; whereby said internal groove operably connects said vacuum line with the closed end portion of the first valve member, the vacuum therein urging said movable valve member to close the flow passage in accordance with the level thereof.

3. In a vacuum milking system having an unregulated vacuum source and a vacuum line, a vacuum regulator connected between said unregulated source and the vacuum line, comprising: a first valve member including an elongated tubular body having a closed top end and an open bottom end, triangular shaped openings in the side walls thereof generally midway the two ends and being in line and opposite one another for connections with said source and vacuum line; a second valve member including an elongated cylindrical element slidable in said first valve member and having an annular recess in the surface thereof generally midway its ends, a flow passage being provided through said vacuum regulator including the triangular openings and the annular recess; a weight affixed to the bottom surface of said elongated element, urging said element toward the open end to open said flow passage; stop means affixed to the first valve member, limiting the downward movement of the second valve member; means, including an internal groove extending from the one of the triangular openings connected to the vacuum line to the closed end of the first valve member, operably connecting the vacuum line with the closed end of said first valve member, the vacuum therein urging said second valve member to close the flow passage in accordance with the vacuum thereof.

4. In a vacuum milking system having an unregulated vacuum source and a vacuum line, a vacuum regulator connected between said unregulated source and the vacuum line, comprising: a first valve member including an elongated tubular body having a closed top end, provided with a hole therein, and an open bottom end, and triangular shaped openings therethrough generally midway the two ends and being in line and opposite one another for connection with the vacuum source and the vacuum line; a second valve member including an elongated cylindrical element slidable in said first valve member and having an annular recess about the surface thereof generally midway its ends, a flow passage being provided through said vacuum regulator by the triangular openings and the annular recess; a weight flexibly affixed to the bottom of said second valve member, urging the second valve member toward said open end to open said flow passage; an annular stop member affixed to the first valve member adjacent the open end, limiting the downward movement of the second valve member; and means connecting the opening in the top closed end of the first valve member to said vacuum line whereby the vacuum therein urges said movable valve member to close said flow passage in accordance with the level thereof.

5. In a vacuum milking system having an unregulated vacuum source and a vacuum line, a vacuum regulator connected between said source and said line, comprising: a first valve member including a tubular body having an open bottom end and a closed top end, and spaced openings through the side wall thereof being aligned one for connection with said source and the other with said line; a second valve member including an elongated cylindrical element slidable in said first valve member and having an annular recess in the surface thereof between its ends, there being a flow passage defined by said valve member; a weight urging the second valve member toward the open end of said body to align said recess with said openings and open said flow passage; means limiting the downward movement of said second valve member to retain said second valve member in said first valve member; and means operably connecting said vacuum line with the closed top end of said first valve member, the vacuum therein urging the valve member toward the closed end of the first valve member to close the flow passage in accordance with the level thereof.

References Cited in the file of this patent

UNITED STATES PATENTS

| | | |
|---|---|---|
| 201,243 | Hand | Mar. 12, 1878 |
| 556,217 | Shiels | Mar. 10, 1896 |
| 1,358,987 | Prince | Nov. 16, 1920 |
| 2,682,880 | Ozmina | July 6, 1954 |